(12) United States Patent
Corn et al.

(10) Patent No.: US 11,026,552 B2
(45) Date of Patent: Jun. 8, 2021

(54) CONSUMER SCRUBBING ARTICLE WITH STAIN RELEASE AND METHOD OF MAKING SAME

(71) Applicant: 3M INNOVATIVE PROPERTIES COMPANY, St. Paul, MN (US)

(72) Inventors: Stewart H. Corn, St. Paul, MN (US); Matthew S. Cole, Woodbury, MN (US); Ibrahim S. Gunes, Minneapolis, MN (US); Windy A. Santa Cruz, Minneapolis, MN (US); Dennard J. Powell, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 126 days.

(21) Appl. No.: 16/069,634

(22) PCT Filed: Jan. 17, 2017

(86) PCT No.: PCT/US2017/013739
§ 371 (c)(1),
(2) Date: Jul. 12, 2018

(87) PCT Pub. No.: WO2017/127350
PCT Pub. Date: Jul. 27, 2017

(65) Prior Publication Data
US 2019/0000294 A1    Jan. 3, 2019

Related U.S. Application Data

(60) Provisional application No. 62/280,362, filed on Jan. 19, 2016.

(51) Int. Cl.
*A47L 13/12* (2006.01)
*A47L 13/16* (2006.01)
(Continued)

(52) U.S. Cl.
CPC ............... *A47L 13/16* (2013.01); *A47L 17/08* (2013.01); *B32B 5/022* (2013.01); *B32B 5/024* (2013.01);
(Continued)

(58) Field of Classification Search
CPC ............ A47L 13/12; A47L 13/16; B32B 5/26
See application file for complete search history.

(56) References Cited

U.S. PATENT DOCUMENTS 4,944,734 A * 7/1990 Wallach ................ A61F 13/537
604/358
5,018,974 A * 5/1991 Carnahan ................ A63F 9/06
428/905

(Continued)

FOREIGN PATENT DOCUMENTS

GB    2 171 293    7/1985
JP    S63-91362    6/1988
(Continued)

OTHER PUBLICATIONS

Hofer, "Ullmann's Encyclopedia of Industrial Chemistry—Foams and Foam Control", Wiley, 2012, vol. 15, pp. 571-598.
(Continued)

*Primary Examiner* — Michael D Jennings
(74) *Attorney, Agent, or Firm* — 3M Innovative Properties Compa

(57) ABSTRACT

A scrubbing article including a substrate, a stain release coating and a texture layer. The stain release coating is applied to the substrate and is present over a at least a major surface of the substrate, and the texture layer is formed over the stain release coating opposite the substrate. In some embodiments, the texture layer is printed on to the stain release coating. The substrate can assume various forms, (Continued)

such as nonwoven, fabric (e.g., woven or knitted), foam, film and sponge material or combinations thereof.

20 Claims, 4 Drawing Sheets

(51) Int. Cl.
| | |
|---|---|
| A47L 17/08 | (2006.01) |
| B32B 5/26 | (2006.01) |
| B32B 27/08 | (2006.01) |
| B32B 27/28 | (2006.01) |
| B32B 5/24 | (2006.01) |
| B32B 25/04 | (2006.01) |
| B32B 27/40 | (2006.01) |
| B32B 5/18 | (2006.01) |
| B32B 27/36 | (2006.01) |
| B32B 5/02 | (2006.01) |
| B32B 27/32 | (2006.01) |
| B32B 27/06 | (2006.01) |
| B32B 27/34 | (2006.01) |
| B32B 5/08 | (2006.01) |
| B32B 27/30 | (2006.01) |

(52) U.S. Cl.
CPC ........... *B32B 5/026* (2013.01); *B32B 5/08* (2013.01); *B32B 5/18* (2013.01); *B32B 5/245* (2013.01); *B32B 5/26* (2013.01); *B32B 25/042* (2013.01); *B32B 25/045* (2013.01); *B32B 27/065* (2013.01); *B32B 27/08* (2013.01); *B32B 27/283* (2013.01); *B32B 27/304* (2013.01); *B32B 27/32* (2013.01); *B32B 27/34* (2013.01); *B32B 27/36* (2013.01); *B32B 27/40* (2013.01); *B32B 2250/02* (2013.01); *B32B 2255/02* (2013.01); *B32B 2255/10* (2013.01); *B32B 2255/102* (2013.01); *B32B 2255/20* (2013.01); *B32B 2255/26* (2013.01); *B32B 2255/28* (2013.01); *B32B 2262/0253* (2013.01); *B32B 2262/0261* (2013.01); *B32B 2262/0284* (2013.01); *B32B 2262/04* (2013.01); *B32B 2262/067* (2013.01); *B32B 2262/14* (2013.01); *B32B 2266/0278* (2013.01); *B32B 2307/538* (2013.01); *B32B 2307/718* (2013.01); *B32B 2432/00* (2013.01)

(56) References Cited

U.S. PATENT DOCUMENTS

| | | | | |
|---|---|---|---|---|
| 5,171,149 | A * | 12/1992 | Alpert | A61C 19/06 401/132 |
| 5,880,083 | A | 3/1999 | Beaujean | |
| 6,579,610 | B1 * | 6/2003 | Shortland | D06N 7/0055 427/180 |
| 7,094,743 | B2 | 8/2006 | Thioliere | |
| 7,135,448 | B2 | 11/2006 | Lentsch | |
| 7,232,364 | B2 | 6/2007 | Hibbard | |
| 7,407,899 | B2 | 8/2008 | Wang | |
| 7,829,478 | B2 * | 11/2010 | Johnson | A47L 13/16 442/101 |
| 8,093,199 | B2 | 1/2012 | Johnson | |
| 8,505,150 | B2 | 8/2013 | Armaly, Jr. | |
| 9,220,389 | B2 | 12/2015 | Dooley | |
| 9,511,018 | B2 * | 12/2016 | Clay | A61K 47/34 |
| 2001/0046594 | A1 * | 11/2001 | Takemoto | B44C 5/0446 428/203 |
| 2002/0050073 | A1 * | 5/2002 | Hagemann | D06F 58/203 34/595 |
| 2003/0028813 | A1 | 2/2003 | Lewis | |
| 2003/0228813 | A1 | 12/2003 | Johnson | |
| 2004/0137814 | A1 * | 7/2004 | Kimbrell, Jr. | D06M 15/277 442/93 |
| 2005/0003979 | A1 | 1/2005 | Lentsch | |
| 2005/0130870 | A1 | 6/2005 | Ochomogo | |
| 2005/0233660 | A1 | 10/2005 | Kimbrell | |
| 2006/0004314 | A1 * | 1/2006 | McCarthy | A61F 13/00034 602/43 |
| 2006/0147614 | A1 * | 7/2006 | Mizuno | C03C 17/3405 427/66 |
| 2006/0178090 | A1 | 8/2006 | Hibbard | |
| 2006/0229229 | A1 * | 10/2006 | Bednarz | B32B 5/245 510/438 |
| 2007/0212965 | A1 | 9/2007 | Smith | |
| 2008/0003906 | A1 | 1/2008 | Hill | |
| 2008/0116414 | A1 | 5/2008 | Moren | |
| 2011/0111174 | A1 * | 5/2011 | Nomura | B32B 3/30 428/153 |
| 2011/0167570 | A1 * | 7/2011 | Littig | B65D 75/366 8/137 |
| 2012/0284946 | A1 * | 11/2012 | Green | A47L 17/08 15/218.1 |
| 2013/0028949 | A1 * | 1/2013 | Celia | B29C 44/02 424/401 |
| 2013/0209735 | A1 | 8/2013 | Kim | |
| 2015/0335221 | A1 | 11/2015 | Dooley | |
| 2016/0367103 | A1 | 12/2016 | Daveloose | |
| 2016/0374531 | A1 | 12/2016 | Daveloose | |
| 2018/0028036 | A1 | 2/2018 | Daveloose | |

FOREIGN PATENT DOCUMENTS

| | | |
|---|---|---|
| WO | 03/104544 | 12/2003 |
| WO | 2005/017250 | 2/2005 |
| WO | 2008/059013 | 5/2008 |

OTHER PUBLICATIONS

International Search report for PCT International Application No. PCT/US2017/013739 dated Apr. 3, 2017, 4 pages.

* cited by examiner

CONSUMER SCRUBBING ARTICLE WITH STAIN RELEASE AND METHOD OF MAKING SAME

BACKGROUND

The present disclosure relates to a scrubbing article having a textured surface. More particularly, it relates to scrubbing articles having a texture layer and a stain release agent.

A variety of cleaning articles in the form of pads and wipes have been developed and made commercially available for household and industrial use. Consumers oftentimes desire to use the articles for cleaning or surface treating tasks requiring scrubbing that in turn may include various degrees of abrading and/or scouring. For example, it can be difficult, if not impossible, to remove dried food from a countertop using an inherently soft article. Conversely, however, consumers strongly prefer that the article not be overly rigid. In some cases, consumers thus desire that the article be drapeable for ease of use. Furthermore, consumers often desire a scrubbing pad or wipe that is not overly abrasive on relatively soft or easily scratched surfaces. In addition, consumers often find cleaning articles that are pre-loaded with a cleaning/disinfecting/sanitizing chemical or chemicals to be extremely useful and convenient.

Scrubbing articles have been developed to address some of the above-identified desires and concerns. For example, U.S. Pat. No. 7,829,478 to Johnson et al. describes a scrubbing wipe article including a nonwoven substrate and a texture layer. The texture layer is a non-crosslinked, abrasive resin-based material that is printed onto at least one surface of the nonwoven substrate. Johnson et al. teach that the texture layer composition is printed onto the substrate and then caused to coalesce to bond the composition to the substrate. Johnson et al. further describe that the resin constituent does not crosslink as part of the coalescing step and that coalescing represents a distinct advantage over other scrubbing wipe article forming techniques in which a lengthy curing period is required to achieve a sufficient hardness value. The scrubbing wipe article of Johnson et al. can be used "dry" or can be loaded with a chemical solution.

Consumers may desire that a scrubbing article not easily stain and/or that any stain formed on the scrubbing article is easily removed or released. Unfortunately, many available cleaning articles (sponge-type cleaning articles, scrubbing-type cleaning articles, etc.) do not provide this feature. While stain blocking agents and stain release agents have previously been employed as treatments for textile articles (e.g., garments), these agents have not been viewed as appropriate for use with scrubbing article constructions such as those of Johnson et al. For example, U.S. Application Publication No. 2013/0209735 to Kim et al. discloses a textile coating that uses either polymer hardness or low surface energy for stain resistance. These and similar techniques are likely not viable with scrubbing article incorporating a printed texture layer as the stain resistance materials are likely to decrease adhesion of a printed texture layer. A hard polymer coating is also likely to decrease conformability of a scrubbing article.

Improvements in the properties of the scrubbing surface (e.g., an imparted texture layer) of a scrubbing article may be beneficial and therefore desirable. A need therefore exists for a scrubbing article that includes the benefits and advantages of a textured surface along with enhanced stain release properties.

SUMMARY

Some aspects of the present disclosure are directed toward a scrubbing article including a substrate, a stain release coating, and a texture layer. The substrate defines opposing, first and second major surfaces. The stain release coating is applied to the substrate as is present over at least the first major surface. The texture layer is formed over the stain release coating opposite the substrate. In some embodiments, the texture layer is formed on the stain release coating. The substrate can assume various forms, such as nonwoven, fabric (e.g., woven or knitted), foam, film and sponge material or combinations thereof. The stain release coating includes a stain release agent. In some embodiments, the stain release agent includes a polymer containing polyethylene oxide (e.g., an agent available under the trade designation "FC-226" from 3M Company of St. Paul, Minn., USA) or a sulfonated polyester (e.g., an agent available under the trade designation "FC-258" from 3M Company of St. Paul, Minn., USA). The texture layer can include discrete portions, with segments of the stain release coating being exposed between the discrete portions and thus available to resist formation of stains. The scrubbing articles of the present disclosure provide a stain-release feature and are surprisingly found to exhibit appropriate adhesion of the texture layer (e.g., a printed texture layer) to the stain release coating.

Other aspects of the present disclosure are directed toward a method of manufacturing a scrubbing article. The method includes providing a substrate defining opposing, first and second major surfaces. A stain release coating is applied to the substrate and is present over the first major surface. A texture layer is formed over the stain release coating opposite the substrate. In some embodiments, the stain release coating includes a non-fluorochemical stain release agent, such as a polymer containing polyethylene oxide or polyvinylpyrrolidone. In some embodiments, the texture layer is printed to the stain release coating and forms a pattern of discrete texture layer portions.

In some embodiments, the stain release coating is present at both the first and second major surfaces of the substrate.

DETAILED DESCRIPTION

Figure 1:
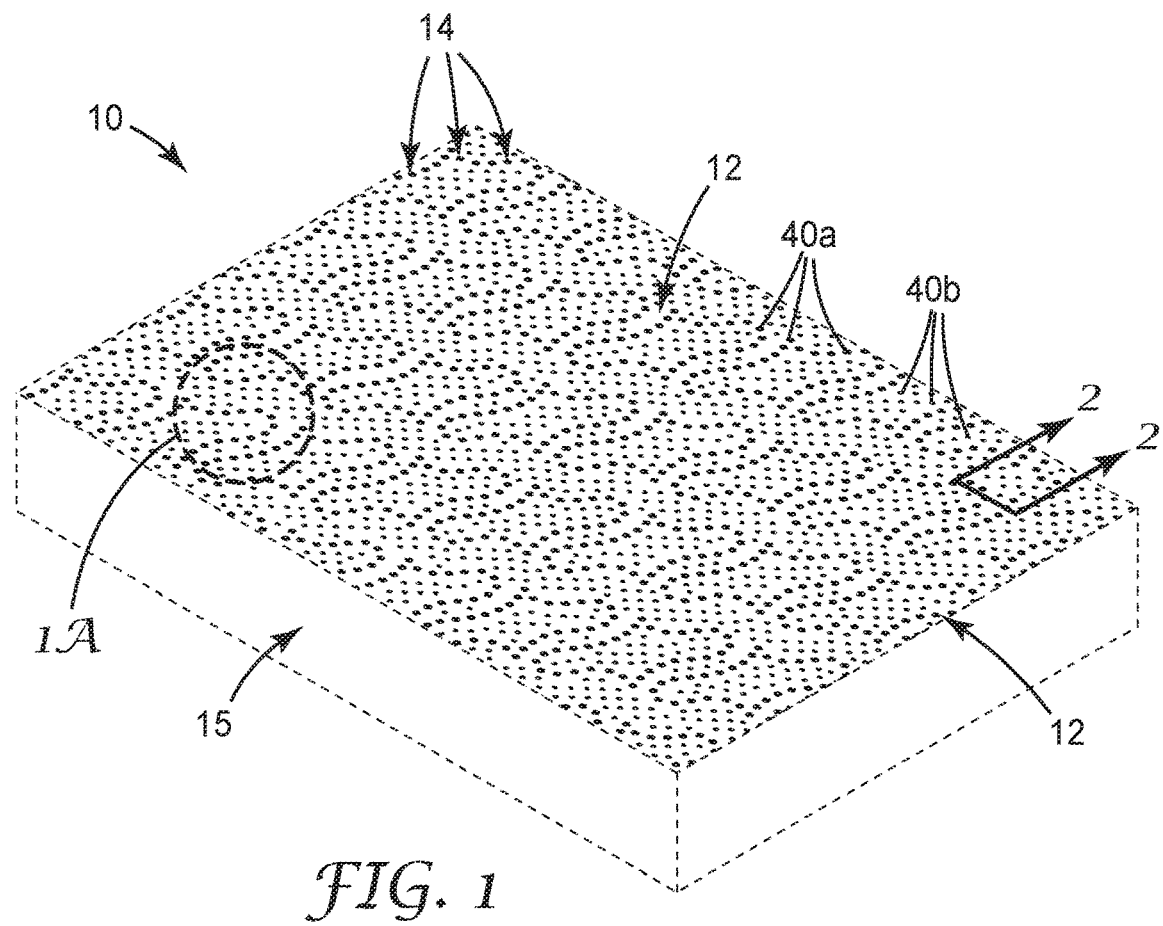
FIG. 1 is a perspective view of an exemplary scrubbing article in accordance with principles of the present disclosure.

FIG. 1 illustrates an embodiment of a scrubbing article 10 in accordance with the present disclosure. The scrubbing article 10 may be described as a consumer cleaning or scrubbing article 10. As used throughout the present disclosure, the term "consumer" is in reference to any household, cosmetic, industrial, hospital or food industry applications and the like of the article 10. Certain embodiments can be used as floor pads or hand pads, for example. Further as used throughout the present disclosure, the term "scrubbing" is used to describe surface treating and may include cleaning, abrading and/or scouring, including various levels or degrees of abrading and/or scouring action (e.g., heavy duty, non-scratch, etc.).

The article 10 comprises a substrate structure 12 and a texture layer 14 (referenced generally in FIG. 1). The substrate structure 12 and the texture layer 14 can comprise a variety of different materials as described in greater detail below. In general terms, the texture layer 14 is formed over a stain release coating of the substrate structure 12. As a point of reference, FIG. 1 further reflects that the scrubbing article 10 can optionally include one or more complimentary or auxiliary bodies 15 (drawn in phantom) to which the substrate structure 12 is attached. A substrate of the substrate structure 12 and the auxiliary body 15 can be formed of differing materials (e.g., the substrate of the substrate structure 12 is a thin nonwoven material and the auxiliary body 15 is a sponge). In other embodiments, the auxiliary body 15 is omitted.

Figure 2:
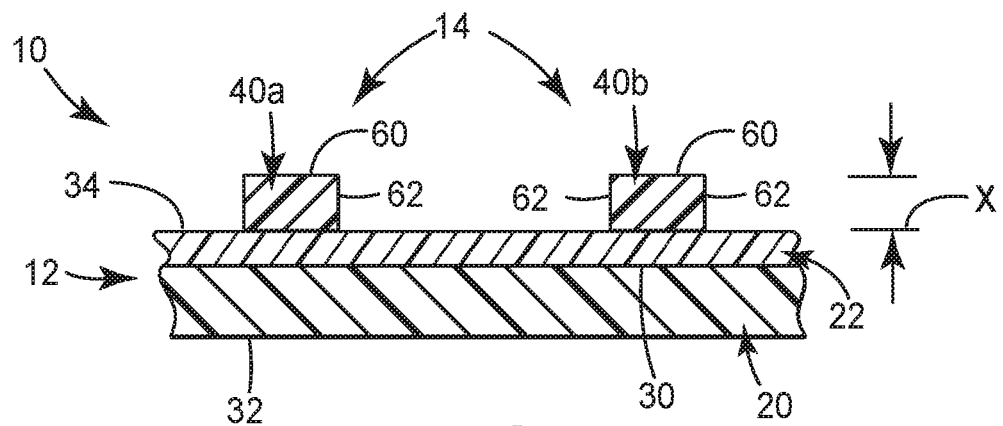
FIG. 2 is an enlarged, cross-sectional view of a portion of the article of FIG. 1 along the lines 2-2, shown in FIG. 1.

With additional reference to FIG. 2, the substrate structure 12 includes at least a substrate 20 and a stain release coating 22. The substrate 20 defines first and second opposing surfaces 30, 32. For purposes of illustration, thicknesses of the substrate 20, the stain release coating 22, and the texture layer 14 may be exaggerated or understated in FIG. 2. The stain release coating 22 is applied to or over at least the first surface 30 of the substrate 20, and in some embodiments can penetrate the first surface 30 to some degree or an entirety of the substrate 20 (e.g., the stain release coating 22 is present at both of the opposing surfaces 30, 32 of the substrate 20). In some embodiments, the stain release coating 22 defines (or is present at) a major face 34 of the substrate structure 12; in other embodiments, one or more additional layers or coatings (apart from the texture layer 14) can be applied or formed over the stain release coating 22 and defines the major face 34 of the substrate structure 12. The texture layer 14 can be formed over the stain release coating 22 (i.e., the texture layer 14 is formed over the major face 34). The texture layer 14 can also penetrate the stain release coating 22 and, in related embodiments the first surface 30 of the substrate 20, to some degree. In other embodiments, the texture layer 14 can be provided over both of the substrate surfaces 30, 32. In some embodiments, the scrubbing article 10 further includes a chemical solution (not shown) loaded into, or absorbed by, the substrate 20 and/or the optional auxiliary body 15. Applicable chemical solutions are likewise described in greater detail below. The texture layer 14 may be configured to accommodate a wide variety of chemical solutions including those that are neutral, cationic, or anionic. Further, the scrubbing article 10 is equally useful without a chemical solution.

Compositions of the texture layer 14, the substrate 20, and the stain release coating 22, as well as processing thereof, are provided below. The scrubbing article 10 may be described as providing a "scrubbiness" attribute. The term "scrubbiness" is in reference to an ability to abrade or remove a relatively small, undesirable item otherwise affixed to a surface as the article is moved back and forth over the item. A substrate can be given a scrubbyness characteristic not only by forming a hardened scrubbing material on the substrate's surface (i.e., harder than the substrate 20 itself), but also and perhaps more prominently via the extent to which the so-formed material extends from or beyond the substrate surface in conjunction with side-to-side spacing between individual sections of the scrubbing material.

Figure 1A:
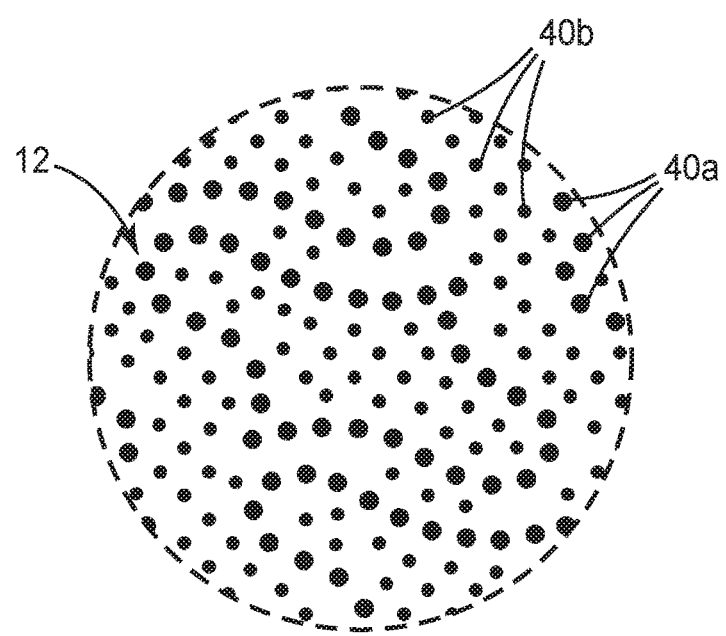
FIG. 1A is an enlarged plan view of a portion of the surface of the scrubbing article of FIG. 1.
Figure 5A:
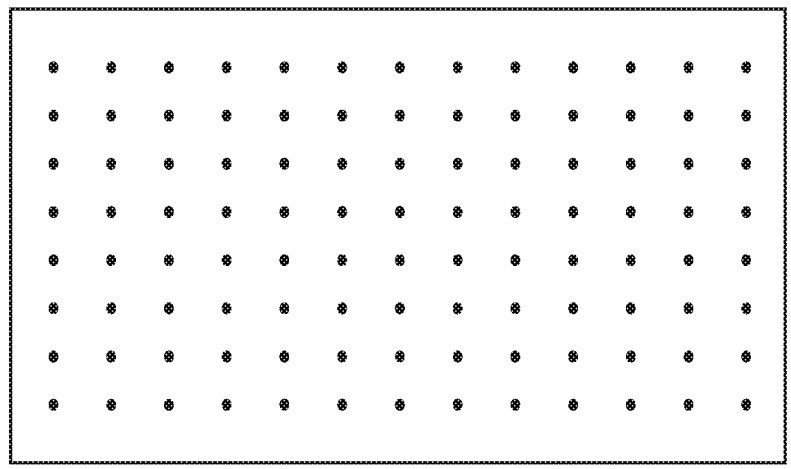
FIGS. 5A-5B are top views of alternative embodiments of a scrubbing article in accordance with principles of the present disclosure.
Figure 5B:
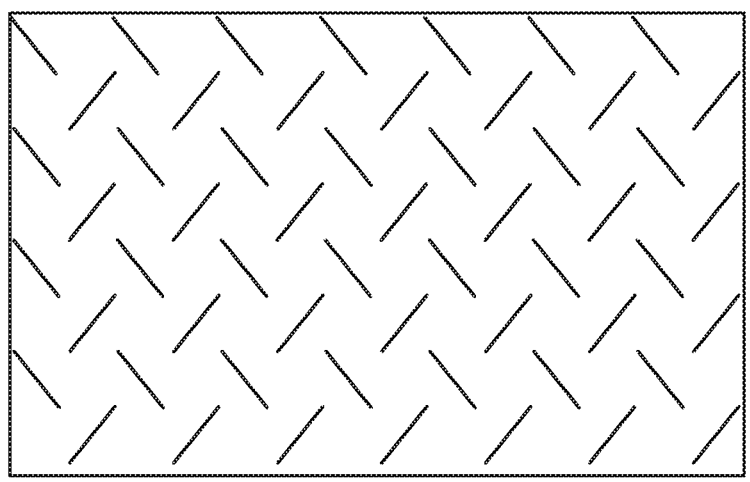

By way of further explanation, the texture layer 14 defines a plurality of discrete portions such as dots or islands (e.g., the various dots shown in FIG. 1 and referenced generally at 40a, 40b). Discrete portions 40a, 40b may form a randomly textured surface or may form a discernable pattern on the stain release coating 22 (and thus on the substrate structure face 34). Further, discrete portions (e.g., 40a, 40b) may comprise varying relative sizes or may be substantially uniform in size. For instance, and as illustrated more clearly in FIG. 1A, dots 40a are relatively larger than dots 40b. As identified in FIG. 2, the discrete portions (e.g., 40a, 40b) each define a height X relative to the substrate structure major face 34. The discrete portions (e.g., 40a, 40b) may extend or project outwardly relative to the substrate structure major face 34 at substantially uniform distances or, alternatively, may extend or project outwardly from the major face 34 at varying distances (i.e., the discrete portions 40a, 40b can have similar or varying heights with respect to the major face 34). In some embodiments, discrete portions (e.g., 40a, 40b) may extend to any distance in a range of about 10 to about 1000 microns outwardly from the major face 34. In other embodiments, discrete portions (e.g., 40a, 40b) may extend at least 10, at least 50, at least 500, or at least 1000 microns outwardly from the major face 34. In still further embodiments, discrete portions (e.g., 40a, 40b) may extend to a distance of 10-20 microns or less outwardly from the major face 34. Regardless, a variety of texturings and/or patterns can be provided on the substrate structure 12. Alternative exemplary embodiments of patterns useful with the present disclosure are shown in FIGS. 5A-5B.

Figure 3:
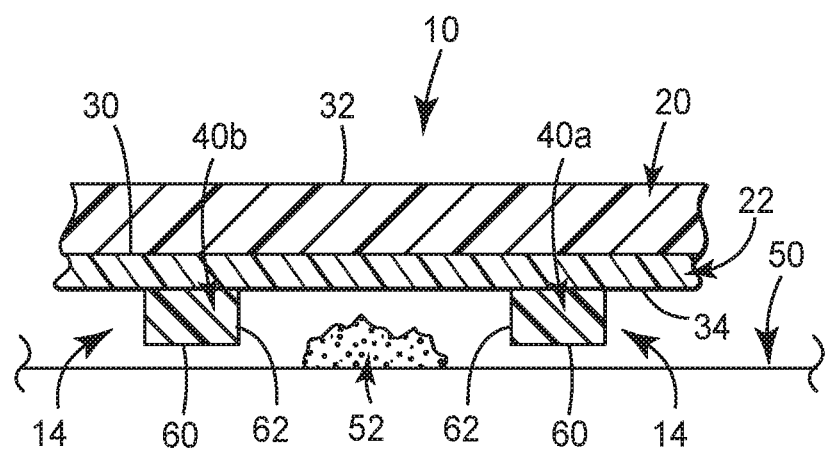
FIG. 3 is an enlarged, cross-sectional view of the article portion of FIG. 2 being applied to a surface.

Regardless of the pattern, design and/or extension distance of portions (e.g., 40a, 40b) from the major face 34, during a scrubbing application, a user (not shown) will normally position the scrubbing article 10 such that the texture layer 14 is facing the surface to be scrubbed. An example of this orientation is provided in FIG. 3 whereby the scrubbing article 10 is positioned to clean or otherwise treat a surface 50. As should be understood, the surface 50 to be cleaned is application specific, and can be relatively hard (e.g., a table top or cooking pan) or relatively soft (e.g., human skin, polymeric baking vessels, etc.). Regardless, in the exemplary embodiment of FIG. 3, the surface 50 to be scrubbed may have a mass 52 that is undesirably affixed thereto. Again, the mass 52 will be unique to the particular scrubbing application, but includes matters such as dirt, dried food, dried blood, etc. The scrubbing article 10 of the present disclosure facilitates scrubbing removal of the mass 52 as a user repeatedly forces the texture layer 14 (or a portion thereof) back and forth across the mass 52. Each section (for example, the sections 40a, 40b) of the texture layer 14 must be sufficiently hard to either abrade or entirely remove the mass 52 during the scrubbing motion. In addition, the texture layer 14 must extend an appreciable distance from the major face 34 to ensure intimate surface interaction with the mass 52 along not only an outer most surface 60, but along sides 62 as well. Portions 40a, 40b, while depicted as having uniform, sharp corners or edges (at the intersection of surface 60 and sides 62), may likewise or instead have rounded edges or corners or may be non-uniform in cross-section. What is important is that the extension of the texture layer 14 is such that the desired scrubbiness is achieved. Notably, many cleaning wipes incorporating a blown fiber "scrubbing" or texture layer provide only a minimal thickness or extension relative to the substrate surface, likely giving rise to a less than desirable scrubbyness characteristic. Further, it is preferred that the discrete portions (for example, the portions 40a, 40b) provided by the texture layer 14 of the present disclosure be sufficiently spaced from one another to ensure intimate contact between the mass 52 and the sidewall 62 of the particular texture layer portion 40a, 40b during a cleaning operation. Further still, it is desirable that the texture layer 14 has abrasion resistance such that the composition forming the texture layer 14 remains substantially intact on the substrate structure 12 during and after the article 10 is used to scrub the surface 50. Finally, the stain release coating 22 minimizes formation of stains on the substrate 20 during cleaning operations, and promotes removal of stains from the substrate structure 12 as described below.

Substrates

The substrate 20 may be formed from a variety of materials and in a variety of forms. Any substrate material or combination of materials suitable for use as a consumer scrubbing article can be used including, without limitation, various nonwoven, fabric (e.g., woven or knitted), foam, sponge and film materials. The materials and forms of the substrate 20 can be selected to provide varying ranges of desired properties, such as extensibility, elasticity, durability, flexibility, printability, etc., that are particularly suited to a given scrubbing task and/or are particularly suited to depositing or forming a texture layer composition thereon. As indicated, materials useful for substrate 20 may be selected to have durability properties in a wide range. For example, the durability of materials suitable for use in scrubbing articles is often categorized as "disposable" (meaning that an article formed from the material is intended to be discarded immediately after use), "semi-disposable" (meaning that an article formed from the material can be washed and re-used a limited number of times), or "reusable" (meaning that an article formed from the material is intended to be washed and re-used). As also indicated above, materials may be selected based upon their flexibility. Depending upon the application, consumers may prefer a relatively flexible, supple or drapable scrubbing article, whereas in other applications, consumers prefer a relatively more rigid article that still maintains some degree of flexibility. In applications where a relatively more supple scrubbing article is preferred (e.g., drapable), providing a more flexible substrate 20 allows the user to readily fold, squeeze, or otherwise manipulate the scrubbing article 10 in a manner most appropriate for the particular scrubbing task. The desired suppleness of the substrate 20 can be characterized by reference to a dry basis weight thereof. With optional embodiments in which the substrate 20 is a nonwoven material, the nonwoven substrate 20 can have a dry basis weight of less than about 300 g/m$^2$, alternatively less than about 200 g/m$^2$, and greater than about 30 g/m$^2$. "Drapability" is defined as the inherent ability to conform to an irregular or non-flat surface. Alternatively, the suppleness of the substrate 20 can be expressed in terms of drapability. Drapability or "drape" is measured using INDA standard for "Handle-O-Meter Stiffness of Nonwoven Fabrics" IST 90.3 (95). With this in mind, the nonwoven versions of the substrate 20 can have a drapability value of less than about 250 in some embodiments. In other embodiments for scrubbing applications where a relatively stiffer, yet still flexible substrate is desired, the substrate 20 may be formed of a composition and into a form that substantially holds its shape both when held lightly by a user or when placed on an irregular surface.

Some exemplary substrates 20 will now be described, however, a wide variety of materials may be used for the substrate 20, as noted above. Exemplary fabrics useful with the present disclosure include knitted fabrics, such as a knitted fabric prepared from 82% poly(ethylene terephthalate) and 18% polyamide 6 fibers having a thickness in a range of 0.45-0.75 mm and a unit weight of 160 grams per square meter. Another exemplary fabric is described in U.S. Provisional Patent Application Ser. No. 62/121,808, entitled, "Multipurpose Consumer Scrubbing Cloths and Methods of Making Same" filed on Feb. 27, 2015, and incorporated by referenced herein in its entirety.

In other embodiments, the substrate 20 can be or can include a nonwoven material or web. With nonwoven embodiments, and in most general terms, the substrate 20 is comprised of individual fibers entangled with one another (and optionally bonded) in a desired fashion. The fibers are preferably synthetic or manufactured, but may include natural materials such as wood pulp fiber. As used herein, the term "fiber" includes fibers of indefinite length (e.g., filaments) and fibers of discrete length (e.g., staple fibers). The fibers used in connection with a nonwoven version of the substrate 20 may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers of the same polymer class (e.g., nylon) but which differ in their properties or characteristics. The term "multicomponent fiber" is thus intended to include, but is not limited to, concentric and eccentric sheath-fiber structures, symmetric and asymmetric side-by-side fiber structures, island-in-sea fiber structures, pie wedge fiber structures, and hollow fibers of these configurations.

In addition to the availability of a wide variety of different types of fibers useful for a nonwoven version of the substrate 20, the technique for bonding the fibers to one another is also extensive. In general terms, suitable processes for making a nonwoven version of the substrate 20 that may be used in connection with some embodiments of the present disclosure include, but are not limited to, spunbond, blown microfiber (BMF), thermal bonded, wet laid, air laid, resin bonded, spunlaced, ultrasonically bonded, etc. In some embodiments, the nonwoven version of the substrate 20 is spunlaced utilizing a fiber sized in accordance with known spunlace processing techniques. With this manufacturing technique, one optional construction of the nonwoven version of the substrate 20 is a blend of 50/50 wt. % 1.5 denier polyester and 1.5 denier rayon at 50-60 g/m$^2$. The nonwoven substrate 20 is first carded and then entangled via high-pressure water jets as is known in the art. The spunlace technique eliminates the need for a thermal resin bonding component, so that the resulting nonwoven substrate is amenable to being loaded with virtually any type of chemical solution (i.e., anionic, cationic, or neutral). Other nonwoven constructions and methods of manufacture are equally acceptable and can include, for example, a thermally point-bonded spunbond poly(ethylene terephthalate) nonwoven wipe.

In other embodiments, the substrate 20 is or includes a foam. An example foam useful with the present disclosure as, or as part of, the substrate 20 is a polyurethane foam having relatively non-porous top and bottom surfaces, commercially available under the trade designation of "TEXTURED SURFACE FOAM, POLYETHER, M-100SF" from Aearo Technologies, LLC, Newark, Del., USA.

In other embodiments, the substrate 20 is or includes a sponge. Exemplary sponges useful with the present disclosure are the cellulose sponges commercially available under the trade designations "SCOTCH-BRITE Stay Clean Non-Scratch Scrubbing Dish Cloth" (having catalog number 9033-Q) and "SCOTCH-BRITE Stay Clean Non-Scratch Scrub Sponge" (catalog number of 20202-12), both from 3M Company, St. Paul, Minn., USA.

In yet other embodiments, the substrate 20 is or includes a film, such as single layer or multi-layered polymer films made by extrusion, solvent casting, calendaring, stretching (e.g., via a tenter or stretching frame) and by other customary polymer processing method, are useful with the present disclosure. Some exemplary films include a plastic film made of melt-extruded, biaxially oriented and primed poly (ethylene terephthalate), polyolefin films, elastomeric films made of physically and chemically cross-linked elastomers, films made of vinyl monomers, such as poly(vinyl chloride), poly(vinylidene chloride) (which is commonly known under the trade designation "SARAN" or "SARAN WRAP" from S.C. Johnson & Son of Racine, Wis.), fluoropolymers, such as poly(vinylidene fluoride), silicones, polyurethanes, polyamides, poly(lactic acid), and combinations thereof.

Other fabrics, sponges, foams, films, wovens and nonwovens are likewise contemplated and the above examples are not meant to be limiting. In yet other embodiments, the substrate 20 can be or include a metal foil, flocked substrate, etc. Regardless of the exact construction, however, the substrate 20 is highly conducive to handling by a user otherwise using the article 10 for scrubbing purposes and is selected having regard to the intended use of the scrubbing article 10.

Although the substrate 20 is depicted in the cross-sectional view of FIG. 2 as a single layer structure, it should be understood that the substrate 20 may be of single or multi-layer construction. If a multi-layered construction is used, it will be understood that the various layers may have the same or different properties, constructions, etc., as is known in the art. For example, in one alternative embodiment, the substrate 20 is constructed of a first layer of 1.5 denier rayon and a second layer of 32 denier polypropylene. This alternative construction provides a relatively soft substrate, such that the resulting scrubbing article 10 is conducive for use cleaning a user's skin, akin to a facial cleansing wipe. In yet other embodiments, as mentioned above with respect to the optional auxiliary body 15 of FIG. 1, the substrate 20 can be connected or attached to a number of other substrate bodies presenting beneficial cleaning or handling properties.

Stain Release Coatings

The stain release coating 22 can assume a variety of forms, and generally includes a stain release agent. In some embodiments, the stain release coating 22 is substantially free of fluorochemicals (i.e., less than 0.1 wt percent fluorochemical). As a point of reference, during use of the scrubbing articles of the present disclosure in household or kitchen cleaning tasks, the scrubbing article may come in occasional contact with food. Thus, some fluorochemical agents may not be desirable for these articles (though may exhibit desired stain release properties). Non-limiting examples of non-fluorochemical stain release agents useful with the present disclosure include an polyethylene oxide containing stain release agent available under the trade designation FC-226 from 3M Company of St. Paul, Minn., and polyvinylpyrrolidone stain release agent available under the trade designation Sokalan K-230 from BASF Corp. of Florham Park, N.J. As described in greater detail below, stain release coatings employing an polyethylene oxide-based stain release agent or the polyvinylpyrrolidone-based stain release agent were surprisingly found to provide good adhesion or bonding with the texture layer 14 with embodiments in which the texture layer 14 is printed on to the stain release coating 22. Other exemplary non-fluorochemical stain release agents useful with the present disclosure include polymers of styrene-maleic anhydride, acrylate, and phenol.

In other embodiments, the stain release agent of the stain release coating 22 can be a fluorochemical stain release agent. A fluorochemical stain release agent may additionally impart anti-staining (i.e. stain prevention) properties. Exemplary fluorochemical stain release agents include, but are not limited to, fluorochemical urethanes (e.g., available, for example, under the trade designations PM-930 and PM-938 from 3M Company of St. Paul, Minn.), etc.

Texture Layer Compositions

As discussed above, the texture layer 14 is an abrasive composition that is imparted to the substrate structure 12. The exact composition of the texture layer 14 can vary depending upon desired end performance characteristics. To this end, a texture layer composition is initially formulated, and then deposited or formed on the substrate structure 12, and then solidifies (active or passive) to complete the texture layer 14. As a point of reference, the "texture layer composition" (or a "texture layer matrix") means the components or ingredients upon final mixing and before application or formation at (e.g., printing, coating, embossing, etc.) the substrate structure 12. The "texture layer precursor" is in reference to the texture layer composition immediately after formation at the substrate structure 12 and prior to solidification. The "texture layer" (i.e., the texture layer 14) means the formed or imparted texture layer following solidification, including following post-formation processing (e.g., heat, UV, e-beam, etc.) if any.

Compositions of the texture layer 14 according to the present disclosure will include a selected resin and may include additional constituents such as ceramic microparticles, mineral(s), filler(s), colorant(s), thickener(s), defoaming agent(s), surfactant(s), soaps, or other cleaning/disinfecting/sanitizing agents, etc. The texture layer 14 may optionally be e-beam treatable/treated and may include compositions such as described in U.S. Provisional Patent Application Ser. No. 62/121,766, entitled "Scrubbing Article and Method of Making Same" filed on Feb. 27, 2015 and incorporated by reference herein in its entirety. Alternately, the texture layer 14 may be UV treatable/treated or cross-linked and may include compositions such as described in U.S. Provisional Patent Application Ser. No. 62/121,705, entitled, "UV Treated Scrubbing Articles and Methods of Making Same" filed on Feb. 27, 2015 and incorporated by reference herein in its entirety. Regardless of the exact composition, the texture layer 14 imparts desired manufacturability, scrubbiness, durability, hardness, and abrasion resistance to the scrubbing article 10. The ceramic microspheres uniquely enhance scrubbiness and abrasion resistance of the texture layer 14 in accordance with principles of the present disclosure.

Various materials are suitable for forming the texture layer 14. As described above, texture layer 14 comprises a resin composition and may comprise various polymers and/or monomers. Useful binder resins in accordance with the present disclosure can assume a wide variety of forms and are generally selected to promote robust securement of the texture layer 14 to the particular format of the substrate structure 12. The binder resin can include a resin capable of solidifying or hardening by various mechanisms, such as drying/release of water, exposure to external energy (e.g., heat, UV light, electron beam irradiation, etc.), and with or without crosslinking. Some acceptable binder resins include those binder resins selected from the group consisting of polyolefins, styrene-butadiene resin, acrylic resin, phenolic resin, nitrile resin, ethylene vinyl acetate resin, polyurethane resin, styrene-acrylic resin, vinyl acrylic resin and combinations thereof. Other non-limiting examples of binder resins useful with the present disclosure include amino resins, alkylated urea-formaldehyde resins, melamine-formaldehyde resins, acrylic resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins, and the like. The resins may be provided as monomers, oligomers, polymers, or combination thereof. Monomers may include multifunctional monomers capable of forming a crosslinked structure, such as epoxy monomers, olefins, styrene, butadiene, acrylic monomers, phenolic monomers, substituted phenolic monomers, nitrile monomers, ethylene vinyl acetate monomer, isocyanates, acrylic monomers, vinyl acrylic monomer and combinations thereof. Other non-limiting examples of binder resins useful with the present disclosure include amino acids, alkylated urea monomers, melamines, acrylic monomers (including acrylates and methacrylates) such as vinyl acrylates, acrylated epoxies, acrylated urethanes, acrylated polyesters, acrylated acrylics, acrylated ethers, vinyl ethers, acrylated oils, and acrylated silicones, alkyd monomers such as urethane alkyd monomers, esters, and the like.

The binder resin is typically applied as a mixture with water, and optionally, a crosslinking agent that, where desired, promotes optional crosslinking of the polymer in the resin. Example of suitable binder resins with optional crosslinking embodiments of the present disclosure includes, for example, latexes such as a carboxylated styrene-butadiene emulsion available under the trade name Rovene 5900 from Mallard Creek Polymers of Charlotte, N.C. Other examples include Rhoplex TR-407 available from Dow Company of New Jersey and Aprapole SAF17 available from AP Resinas of Mexico City, Mexico. With embodiments in which crosslinking of the selected binder resin is desired, the texture layer composition can include an appropriate crosslinking agent such as, for example, melamine formaldehyde dispersions. Other optional crosslinking initiator, promoter or retardant agents can alternatively be provided as part of the formulation of the texture layer composition (e.g., that assist with optional UV crosslinking and/or e-beam crosslinking or polymerization).

Other binder resins that may be heat curable are an extension of the present disclosure if compatibility with the material of the substrate structure 12 and is found.

With embodiments in which crosslinking of the selected binder resin is not necessary or intended, the binder resin can assume a variety of forms, and may or may not be a thermoplastic. The non-crosslinking binder resin can be a polyacrylate, modified polyacrylate, polyurethane, polyvinyl acetate, copolyamide, copolyester, or phenolic, as well as other latexes.

The particular binder resin and weight percent relative to the texture layer composition can be fine-tuned to satisfy the desired end application constraints. However, the selected binder resin is characterized as being flowable in matrix form in a manner that will soak only partially, if at all, into the substrate structure 12 (i.e., will not soak through or wet out the substrate structure 12) upon forming thereon, and will harden, cure or coalesce optionally upon exposure to various conditions (e.g., heat, UV, e-beam, etc.). Additionally, the binder resin component of the texture layer 14 is optionally non-ionic in some embodiments. The non-ionic nature of the binder resin facilitates use of virtually any form of chemical solution with the scrubbing article 10 where so desired.

In some embodiments, the composition of the texture layer 14 may include ceramic microparticles and related processing agents as described in U.S. Provisional Patent Application Ser. No. 62/121,644, entitled, "Consumer Scrubbing Article with Ceramic Microparticles and Method of Making Same" filed on Feb. 27, 2015 and incorporated by referenced herein in its entirety.

In some embodiments, the texture layer 14 optionally further includes a particulate additive (apart from or in addition to the ceramic microparticles mentioned above) for enhanced hardness. To this end, the scrubbing article 10 of the present disclosure is useful in a wide variety of potential applications having different scrubbing requirements. For some applications, it is desirable that the scrubbing article 10, and in particular the texture layer 14, be more or less abrasive than others. While the above-described resin component of the texture layer 14 independently imparts a scrubbiness feature to the article 10 greater than other available scrubbing articles, this scrubbiness characteristic can be further enhanced via the addition of a particulate component. With this in mind, a wide variety of minerals or fillers as known in the art can be employed. Useful minerals include $Al_2O_3$, "Minex" (available from The Cary Co. of Addison, Ill.), $SiO_2$, $TiO_2$, etc. Exemplary fillers include $CaCO_3$, talc, etc. Where employed, the particulate component additive comprises less than 70% by weight of the texture layer 14, more preferably less than 50% by weight, most preferably less than 30% by weight. Further, the particulate component may consist of inorganic, hard, and small particles. For example, the "Minex" mineral particulate component has a median particle size of 2 microns and a Knoop hardness of about 560. Of course, other particle size and hardness values may also be useful. The inorganic nature of the particulate component, in conjunction with the non-ionic resin component, renders the resulting texture layer 14 amenable for use with any type of chemical solution.

As indicated above, the texture layer composition may optionally include additional constituents, such as process agents or aids. For example, the texture layer composition can include a thickening agent or agents to achieve a viscosity most desirable for the particular formation technique (e.g., printing) employed and speed of the manufacturing line. Materials may be selected to have molecular weights or viscosities allowing the texture layer composition or matrix to be flowable in a manner that will fill the holes or voids of a stencil pattern (for example) during transfer of the texture layer composition to the substrate structure 12, sufficiently adhere to the substrate structure 12, and to hold the desired pattern shape upon removal of the stencil (or other body) from the substrate structure 12 even prior to subsequent processing steps (if any). Appropriate thickening agents are known in the art and include, for example, methylcellulose and a material available under the trade designation "RHEOLATE 255" from Rheox, Inc. of Hightstown, N.J. Another acceptable thickening agent is available from Huntsman International LLC, High Point, N.C., USA under the trade designation "LYOPRINT PT-XN". A thickening agent may be unnecessary depending upon the selected bonder resin and formation technique; however, where employed, the thickening agent preferably comprises less than approximately 40% by weight of the texture layer composition. In other embodiments, a salt component may be provided in the texture layer composition to aid in causing an ionic reaction between components of an emulsion and thereby likewise generate an increase in the viscosity of the composition, as is known in the art.

Anti-foaming agents may be included in the composition to provide defoaming or emulsification of the composition. As described in *Ullmann's Encyclopedia of Industrial Chemistry* (section "Foams and Foam Control"), some anti-foaming materials are carrier oils; such as water-insoluble paraffinic and naphthenic mineral oils, vegetable oils, tall oil, castor oil, soybean oil, peanut oil; silicone oils, such as dimethylpolysiloxanes; hydrophobic silica; Hydrophobic fat derivatives and waxes, such as fatty acid esters of mono-functional and polyfunctional alcohols, fatty acid amides and sulfonamides, paraffinic hydrocarbon waxes, ozokerite, and montan wax, phosphoric acid mono-, di-, and triesters of short- and long-chain fatty alcohols, short- and long-chain natural or synthetic fatty alcohols, water-insoluble soaps of long-chain fatty acids, including aluminum stearate, calcium stearate, and calcium behenate, perfluorinated fatty alcohols; water-insoluble polymers, such as low molecular mass, fatty acid modified alkyd resins, low molecular mass novolaks, copolymers of vinyl acetate and long-chain maleic and fumaric acid diesters, and methyl methacrylate-vinylpyrrolidone copolymers, poly(propyleneglycols) and high molecular mass propylene oxide adducts to glycerol, trimethylol, propane (1,1,1-tris(hydroxymethyl)propane), pentaerythritol, triethanolamine, dipentaerythritol, polyglycerol, addition products of butylene oxide or long-chain a-epoxides with polyvalent alcohols. An example anti-foaming agent is a silicone emulsion commercially available under the trade designation "XIAMETER AFE-1520" by Dow Corning Corporation of Midland, Mich., USA.

In addition, an initiator, a promoter, or a retardant can optionally be provided as part of the formulation or composition of texture layer 14, according to some embodiments of the present disclosure, as described in detail in Provisional Patent Application Ser. No. 62/121,766, incorporated by reference herein above.

The texture layer composition optionally includes one or more additives. For example, the texture layer composition can include a colorant or pigment additive to provide a desired aesthetic appeal to the scrubbing article 10. Appropriate pigments are well known in the art, and include, for example, products sold under the trade designation "SUNSPERSE" from Sun Chemical Corp. of Amelia, Ohio. Other coloring agents as known in the art are equally acceptable and in some embodiments comprise less than 10% of the texture layer composition by weight.

Finally, and as previously described, the scrubbing article 10 of the present disclosure can be used "dry" or can be loaded with a chemical (solution or solid) for disinfecting, sanitizing or cleaning (e.g., a soap). The term "loaded" is in reference to a chemical solution being absorbed by the substrate structure 12 (or an auxiliary body secured to the substrate structure 12) prior to being delivered to a user. In addition or alternatively, the chemical may be sprayed onto a surface of the cloth. In still further embodiments, a chemical may be provided in or as part of the texture layer 14 composition. Thus, deposited (e.g., printed) texture layer 14 may comprise printed soap scrubbing dots (e.g., 40a, 40b, FIG. 3). With these various constructions, during use, the chemical solution is released from the substrate structure 12 as the user wipes the scrubbing article 10 across a surface. Thus, in embodiments where the chemical is provided as part of the texture layer 14, the texture layer (i.e., scrubbing portions 40a, 40b) may gradually decrease in size as the chemical is consumed during a scrubbing application. Due to the optional non-ionic nature of the texture layer 14, virtually any desired chemical can be used, including water, soap, quaternary ammonium salt solutions, Lauricidin™-based anti-microbials, alcohol-based anti-microbials, citrus-based cleaners, solvent-based cleaners, cream polishes, anionic cleaners, amine oxides, etc. That is to say, where employed, the chemical solution can be anionic, cationic, or neutral.

Formation of the Scrubbing Article

Figure 4:
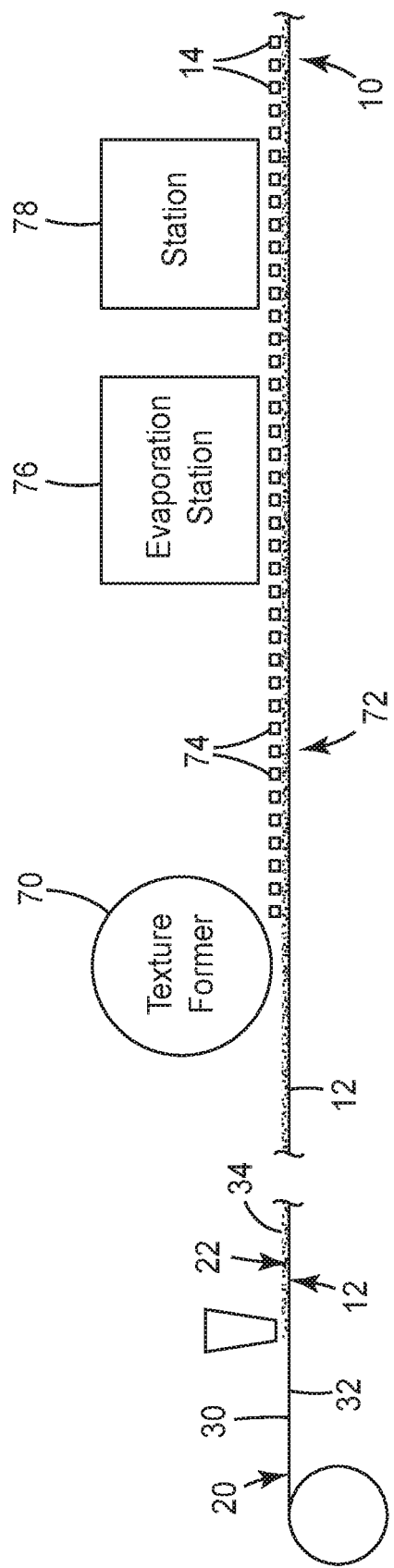
FIG. 4 is a simplified illustration of a method of manufacture in accordance with principles of the present disclosure.

Manufacture or formation of the scrubbing article 10 of the present disclosure is depicted in the simplified block form of FIG. 4 and generally includes, preparing the substrate structure 12, formulating the appropriate texture layer composition, and then imparting the composition onto the substrate structure 12 (e.g., via printing, coating, etching, embossing, molding, etc.). As reflected by FIG. 4, portions or an entirety of some methods of the present disclosure are continuous or in-line. For example, a web of the substrate structure 12 can be prepared in a first operation, with a continuous web of the substrate structure 12 later being conveyed through other processing stations to effectuate imparting of the texture layer 14. Regardless, and as described in greater detail below, with embodiments in which the texture layer 14 is printed on to the substrate structure 12, it has surprisingly been found that the printed texture layer 14 adheres to the stain release coating 22 at levels sufficient for use of the resultant scrubbing article 10 in cleaning and scrubbing applications.

The substrate structure 12 can be formed by applying a selected composition of the stain release coating 22 to a continuous web of the selected substrate 20 as reflected by FIG. 4. The stain release coating 22 can be applied in various manners known in the art, including roll coating or spray coating. In other embodiments, the substrate 20 can be immersed in a volume of the stain release coating 22. Regardless, the stain release coating 22 is present at least at or over the first surface 30 of the substrate 20. Where beneficial, methods of the present disclosure can include further processing that promotes solidification or drying of the applied stain release coating 22 (e.g., heat). Other materials can optionally be applied to the substrate 20 before, during, or after application of the stain release coating 22, such as a colorant, biocide, etc. In some embodiments, the stain release coating 22 is an outermost layer or coating, and defines the major face 34 of the final substrate structure 12; that is to say, the stain release coating 22 is present at the major face 34.

Prior to forming the texture layer composition to the substrate structure 12, depending upon the type of substrate, the major face 34 of the substrate structure 12 may be primed. Priming may involve mechanical, chemical, physical and material application methods. For example, some surface priming methods that may be especially useful with the present disclosure include consolidating one side of a substrate with the use of heat and/or pressure, flame treating/melting, cutting or removing substrate material. Alternatively, priming may include application of a chemical primer such as an adhesive. Notably, however, for many substrate structures 12, no primer is necessary prior to transfer of the texture layer composition onto the substrate structure 12 to achieve adequate adhesion.

The texture layer composition can be formed on the substrate structure 12 using a variety of known techniques such as printing (e.g., screen printing, gravure printing, flexographic printing, etc.), coating (e.g., roll, spray, electrostatic), etching, laser etching, injection molding, micro-replicating and embossing. In general terms, and with reference to FIG. 4, a texture former (of various types) 70 deposits or prints a texture layer onto the substrate structure 12 in any desired pattern, such as any of the various patterns described above. The texture former 70 can include, for example, a printer, roll coater, spray coater, etching device, micro-replication machine, laser embossing equipment, etc. As on specific, non-limiting example, use a printing method for imparting the texture layer 14 may be advantageous in that printing techniques can provide a relatively high-definition application of the texture layer composition. Some printing techniques may also afford relative ease of manufacture and lower cost as compared to other texture forming techniques described above. Regardless of the texture forming technique, as previously described, the texture layer 14 covers less than an entirety of the substrate structure surface on which it is formed (i.e., the face 34), and is preferably formed in a pattern including two or more discrete sections. In this regard, a wide variety of patterns can be formed. For example, the pattern can consist of a plurality of dots as shown in FIG. 1. Alternatively, the pattern can include two (or more) interconnected lines. In yet other embodiments, and with additional reference to FIGS. 5A-5B, the texture layer 14 consists of a plurality of discrete lines, dots, and/or images. Further, other desirable pattern components, such as a company logo, can be formed. Alternatively, a more random distribution of texture layer sections can be imparted to the substrate structure 12. Virtually any pattern can be obtained.

In some embodiments, the texture layer composition is sufficiently solidified and attached to the substrate structure 12 immediately after application and/or without post-printing processing. In other embodiments, methods of the present disclosure can include further processing that promotes solidification and/or attachment of the texture layer precursor. For ease of explanation, with embodiments in which the texture layer composition is such that post-printing processing is desirable, an interim scrubbing article 72 can be defined along a length of the continuous substrate structure 12 immediately downstream of the texture former 70 as identified in FIG. 4, and generally includes a texture layer precursor 74 applied to the substrate structure 12. The interim scrubbing article 72 may be allowed to remain undisturbed (allowed to wait) for a period of time. Subsequent processing of the interim scrubbing article 72 can include one or more water evaporation stations 76 (e.g., oven, UV light, infrared light, etc.) located downstream of the texture former 70. With regard to infrared exposure, often infrared light exposure is more cost effective than heating via an oven. However, unless the composition of material undergoing infrared light exposure is naturally highly absorbing of infrared light, an additive may be required to allow absorption of the infrared light by the composition. An example of an additive useful for aiding in infrared absorption is carbon black. It is to be understood that for some texture layer compositions, no excess water is present in the texture layer precursor 74, thus no evaporation step may be desired or necessary.

Notably and advantageously, the interim scrubbing article 72, either prior or subsequent to the wait period and/or the evaporation step, may be formed into a roll (a rolled interim article 72 and roll-forming step are not shown) in a manner of material winding as is known in the art. As described above, the texture layer composition may have a molecular weight and/or viscosity that advantageously allows for this type of roll-forming prior to optional, subsequent treatment of the texture layer precursor 74.

In some embodiments, the texture layer precursor 74 solidifies, cures, hardens, coalesces, or otherwise transitions to the final texture layer 14 and is sufficiently attached to the substrate structure 12 following processing at the water evaporation station 76 without further active steps (i.e., the interim scrubbing article 72 is converted to the final scrubbing article 10 after processing by the water evaporation station 76). In other embodiments, the interim scrubbing article 72 can be subjected to other processing steps. For example, after the texture layer precursor 74 has been imparted to the substrate structure 12, and after any or all of the optional wait period, evaporation, or roll-forming steps described above, the interim scrubbing article 72 can optionally be subjected to processing at a crosslinking or polymerization station 78 adapted to promote crosslinking or polymerizing, or both, of the texture layer composition formed thereon. For example, the station 78 can be configured to generate electron beam (e-beam) or ultraviolet (UV) radiation that irradiates the texture layer precursor 74 of the interim scrubbing article 72 to thus forming the resultant scrubbing article 10. Optional e-beam or UV radiation steps and corresponding texture layer compositions are described in U.S. Provisional Patent Application Ser. No. 62/121,766, entitled "Scrubbing Article and Method of Making Same" and U.S. Provisional Patent Application Ser. No. 62/121,705, entitled, "UV Treated Scrubbing Articles and Methods of Making Same", each filed on Feb. 27, 2015 and incorporated by reference herein in their respective entireties.

EXAMPLES

Objects and advantages of the present disclosure are further illustrated by the following non-limiting examples and comparative examples. The particular materials and amounts thereof recited in these examples, as well as other conditions and details, should not be construed to unduly limit the present disclosure.

Unless otherwise noted, all parts, percentages, ratios, etc. in the Examples and the rest of this specification are by weight. Unless otherwise noted, all composition amounts in the Examples are in grams.

Abbreviations for materials and reagents used in the examples are as follows:

Substrate 1: 100 g/m$^2$ non-woven of 70% poly(ethylene terephthalate) and 30% nylon fibers, commercially available under the trade designation "SOFT-X" from Oxco Inc., Charlotte, N.C., USA.

Substrate 2: A non-woven cloth made of poly(ethylene terephthalate) fibers, with a unit weight of 100 g/m$^2$, commercially available under the trade designation "FINON C310 NW" from Midwest Filtration LLC, Cincinnati, Ohio, USA.

Substrate 3: 80 g/m2 non-woven blend of PET and nylon fibers, commercially available under the trade designation "EVOLON 80 B Plain" from Freudenberg, Colmar, France.

Substrate 4: 136 g/m$^2$ spunbond non-woven made of 100% nylon fiber, commercially available under the trade designation "Type 30, Style 30300120" from Cerex Advanced Fabrics, Inc., Franklin, Tenn., USA.

Release Agent (RA) 1: An aqueous phenolic polymer solution with 30% solids content, commercially available under the trade designation "FLEXISPERSE AM-210" from Innovative Chemical Technologies, Inc., Cartersville, Ga., USA.

RA 2: An aqueous acrylic polymer solution with 25% solids content, commercially available under the trade designation "FLEXISPERSE PM-25" from Innovative Chemical Technologies, Inc., Cartersville, Ga., USA.

RA 3: A nonionic fluorochemical resin solution with 30% solids content, commercially available under the trade designation "PM-490" from 3M Company, Saint Paul, Minn., USA.

RA 4: An aqueous solution of styrene maleic anhydride copolymer with 30% solids content, commercially available under the trade designation "XIRAN SL40005-N30" from Polyscope, Inc., Geleen, The Netherlands.

RA 5: An aqueous polyvinylpyrrolidone solution with 30% solids content, commercially available under the trade designation "SOKALAN K-30" from BASF, Ludwigshafen, Germany.

RA 6: A cationic fluorochemical emulsion with 30% solids content, commercially available under the trade designation "PM-930" from 3M Company, St. Paul, Minn., USA.

RA 7: A cationic fluorochemical resin solution with 30% solids content, commercially available under the trade designation "PM-938" from 3M Company, Saint Paul, Minn., USA.

RA 8: A sodium salt of a sulfonated polyester with 100% solids content, commercially available under the trade designation "FC-258" from 3M Company, Saint Paul Minn., USA.

RA 9: An aqueous solution of a copolymer of maleic and acrylic acid with 40% solids content, commercially available under the trade designation "SOKALAN CP-5" from BASF, Ludwigshafen, Germany.

RA 10: A non-ionic solution of a polyethylene oxide containing polymer with 20% solids content, commercially available under the trade designation "FC-226" from 3M Company, St. Paul, Minn., USA.

Biocide: An aqueous dispersion of zinc, 2-pyridinethiol-1-oxide with 48% solids content, commercially available under the trade designation "ZINC PYRION" from Janssen Pharmaceutica, Beerse, Belgium.

Latex 1: An aqueous acrylic emulsion with pH of 5, Tg about −12 C, and a solids content of 42%, commercially available under the trade designation "ACRYGEN APB" from Omnova Solutions, Beachwood, Ohio, USA.

Latex 2: Carboxylated styrene-butadiene emulsion with a Brookfield viscosity of 200 cps (#2/20 rpm) and pH of 9.0, commercially available under the trade designation "ROVENE 5900" from Mallard Creek Polymers, Inc., Charlotte, N.C., USA.

Pigment 1: Water dispersible green pigment concentrate with a 60% solids content and color index 74260, commercially available under the trade designation "GCD-9957" from Sun Chemical, Amelia, Ohio, USA.

Pigment 2: Liquid white pigment with a density of 1.98 g/mL, commercially available under the trade designation "SUNSPERSE WHITE 6" from Sun Chemical Corporation, Cincinnati, Ohio, USA.

Thickener: Fully neutralized, anionic acrylic polymer dispersion with a density of 1.1 g/mL, commercially available under the trade designation "LYOPRINT PT-XN" from Huntsman International LLC, High Point, N.C., USA.

Silicone Emulsion: Silicone emulsion with a density of 1.0 g/mL and pH of 4, commercially available under the trade designation "XIAMETER® AFE-1520" from Dow Corning Corp., Midland, Mich., USA.

Surfactant: Nonionic stabilizer for latex emulsions with a density of 1.02 g/mL, commercially available under the trade designation "INDOLUBE PPL" from Indusco, Ltd., Greensboro, N.C., USA.

Filler: Ground calcium carbonate powder with a density of 2.7 g/cm$^3$, commercially available under the trade designation "SNOWHITE 12-PT" from Omya International AG, Oftringen, Switzerland.

Substrate Structure with Stain Release Examples

Example substrate structures including a stain release coating were prepared by applying a treatment composition to a substrate. The treatment compositions of Examples A-O consisted of a selected stain release agent (RA) (listed in Tables 1-1 and 1-2) mixed with deionized water (DI) at 25° C. at the proportions listed in Tables 1-1 and 1-2 except as noted below. RA 8 (Example M) is a solid and a premix was made by mixing 20 grams of RA 8 with 80 grams of hot deionized water to make a polymer solution with 20% solids content. The treatment compositions of Examples P-R consisted of a selected stain release agent (RA), latex (Latex 1), a pigment (Pigment 1), and a biocide agent (Biocide) mixed with deionized water at 25° C. as listed in Table 1-2. All ingredients were weighted out to the nearest 0.1 grams in separate plastic containers in desired quantities. The treatment compositions of Examples A-O were applied to a dry sample of Substrate 1. The treatment composition of Example P was applied to a dry sample of Substrate 2. The treatment composition of Example Q was applied to a dry sample of Substrate 3. The treatment composition of Example R was applied to a dry sample of Substrate 4. In all cases, the treatment composition was applied to the dry substrate using padding equipment (Model HP-1700, commercially available from Poterala Manufacturing Co., Greenville, S.C., USA) with nip pressures set to 5.5×10$^5$ Pa (80 psi). The wet pick up of Substrate 1 was approximately 95%, and the treatment composition of Examples A-G, I, and M-O was made at a comparable level of stain release agent solids applied on the corresponding substrate (namely, 0.57% "solids on fabric" (% SOF)). Other SOF levels were prepared for Examples H and J-L as listed in Tables 1-1 and 1-2. The wet pick up of Substrate 2 was approximately 104%, and the treatment composition of Example P was applied at a level of stain release agent solids of 0.62% SOF. The wet pick up of Substrate 3 was approximately 90%, and the treatment composition of Example Q was applied at a level of stain release agent solids of 0.54% SOF. The wet pick up of Substrate 4 was approximately 104%, and the treatment composition of Example R was applied at a level stain release agent solids of 0.62% SOF. Following application of the treatment composition, the test samples were dried and cured for two minutes at 177° C. (350° F.) in a laboratory hot air circulating oven (Model V-35HD, commercially available from Despatch Industries, Minneapolis, Minn., USA). Comparative Example A consisted of a sample of Substrate 1 alone (no treatment composition).

TABLE 1-1

| Example | A | B | C | D | E | F | G | H | I | J | K | L |
|---|---|---|---|---|---|---|---|---|---|---|---|---|
| DI | 98 | 97 | 97.6 | 98 | 98 | 98 | 98 | 94 | 97 | 98.5 | 99.5 | 99.9 |
| RA 1 | 2 | | | | | | | | | | | |
| RA 2 | | | 2.4 | | | | | | | | | |
| RA 3 | | | | 2 | | | | | | | | |
| RA 4 | | | | | | | 2 | | | | | |
| RA 5 | | | | | | | | | | | | |
| RA 6 | | | | | 2 | | | | | | | |
| RA 7 | | | | | | | 2 | | | | | |
| RA 8 | | | | | | | | | | | | |
| RA 9 | | | | | | | | | | | | |
| RA 10 | | 3 | | | | | | 6 | 3 | 1.5 | 0.5 | 0.1 |
| Latex 1 | | | | | | | | | | | | |
| Pigment 1 | | | | | | | | | | | | |
| Biocide | | | | | | | | | | | | |
| Treatment Total | 100 | 100 | 100 | 100 | 100 | 100 | 100 | 100 | 100 | 100 | 100 | 100 |
| % SOF Substrate 1 | 0.57 | 0.57 | 0.57 | 0.57 | 0.57 | 0.57 | 0.57 | 1.14 | 0.57 | 0.28 | 0.09 | 0.02 |
| % SOF Substrate 2 | | | | | | | | | | | | |
| % SOF Substrate 3 | | | | | | | | | | | | |
| % SOF Substrate 4 | | | | | | | | | | | | |

TABLE 1-2

| Example | M | N | O | P | Q | R |
|---|---|---|---|---|---|---|
| DI | 97 | 98 | 98.5 | 84.75 | 84.75 | 84.75 |
| RA 1 | | | | | | |
| RA 2 | | | | | | |
| RA 3 | | | | | | |
| RA 4 | | | | | | |
| RA 5 | | 2 | | | | |
| RA 6 | | | | | | |
| RA 7 | | | | | | |
| RA 8 | 3 | | | | | |
| RA 9 | | | 1.5 | | | |
| RA 10 | | | | 3 | 3 | 3 |
| Latex 1 | | | | 10 | 10 | 10 |
| Pigment 1 | | | | 1.5 | 1.5 | 1.5 |
| Biocide | | | | 0.75 | 0.75 | 0.75 |
| Treatment Total | 100 | 100 | 100 | 100 | 100 | 100 |
| % SOF Substrate 1 | 0.57 | 0.57 | 0.57 | | | |
| % SOF Substrate 2 | | | | 0.62 | | |
| % SOF Substrate 3 | | | | | 0.54 | |
| % SOF Substrate 4 | | | | | | 0.62 |

Examples A-R and Comparative Example 1 were evaluated for stain release characteristics by the American Association of Textile Chemists and Colorists (AATCC) Standard Test Method No. TM-130-2010. Four different soiling or staining compositions were applied at separate location along each substrate sample as described below. The first staining composition ("Stain E") was corn oil, commercially available under the trade designation "MAZOLA®" from ACH Food Companies, Inc., Ankeny, Iowa, USA. The second staining composition ("Stain K") was white mineral oil, commercially available under the trade designation "KAYDOL™" from Sonneborn, Inc., Tarrytown, Md., USA. The third staining composition ("Stain D") was salad dressing, commercially available under the trade designation "CATALINA" from Kraft Foods, Northfield, Ill., USA. The fourth staining composition ("Stain S") was spaghetti sauce, commercially available under the trade designation "Prego Traditional Italian Sauce" from Campbell Soup Co., Camden, N.J., USA. For each test sample, five drops of Stain E, five drops of Stain K, a total of 1.5 grams (+/−0.3 grams) Stain D, and a total of 1.5 grams (+/−0.3 grams) Stain S were applied. Following completion of the washing condition protocols of AATCC TM-130-2010, the stain release properties with respect to each of the four stains was visually evaluated. A rating scale reference in AATCC TM-130-2010 was used in which a rating of "1" corresponds to a very heavy stain, and an "8" corresponds to complete stain removal. Results are shown in Table 2. A passing rating is deemed to be a rating of approximately 6 or greater for all four stains.

TABLE 2

| Sample | Stain K | Stain E | Stain S | Stain D |
|---|---|---|---|---|
| Ex. A | 8 | 7 | 6 | 5 |
| Ex. B | 8 | 8 | 6.5 | 7 |
| Ex. C | 8 | 4.5 | 4 | 4.5 |
| Ex. D | 4 | 5 | 5 | 4 |
| Ex. E | 8 | 7.5 | 6.5 | 7 |
| Ex. F | 5 | 4.5 | 6 | 4.5 |
| Ex. G | 8 | 8 | 7.5 | 7.5 |
| Ex. H | 8 | 8 | 6.5 | 7.5 |
| Ex. I | 8 | 8 | 6.5 | 7.5 |
| Ex. J | 8 | 8 | 6 | 7 |
| Ex. K | 8 | 8 | 5.5 | 6 |
| Ex. L | 7 | 6 | 4.5 | 4.5 |
| Ex. M | 6.5 | 7 | 6 | 5.5 |
| Ex. N | 7.5 | 8 | 6 | 7 |
| Ex. O | 8 | 5 | 3 | 4 |
| Ex. P | 8 | 8 | 8 | 6 |
| Ex. Q | 8 | 8 | 6.5 | 6 |
| Ex. R | 7.5 | 7 | 6.5 | 7.5 |
| Comp. Ex. | 6 | 5 | 3 | 4 |

The results of Table 2 show that the polyethylene oxide containing polymer FC-226 (RA 10) gave good stain release at a wide range of levels (0.28% SOF to at least 1.14% SOF). Two fluorochemicals PM-930 (RA 6) and PM-938 (RA 8) also showed good stain release, as did the polyvinylpyrrolidone (RA 5). All other treatment compositions showed poorer performance at the concentrations tested (0.57% SOF). All stain release treatments showed better stain release than the untreated Comparative Example.

Texture Layer Adhesion Examples

Sample scrubbing articles were prepared by printing a texture layer onto the substrate structures of Examples G-I, L-N, P and Q and the Comparative Example above. In particular, a texture layer composition was prepared by mixing the ingredients of Table 3 at the amounts listed in Table 3 in a rigid plastic container using a high shear mixing blade. Prior to mixing, all ingredients were weighted out to the nearest 0.01 grams in separate plastic containers in desired quantities. The ingredients were added in the order as listed in Table 3. After all the ingredients were added, the mixture was stirred for an additional 5-10 minutes.

TABLE 3

| Component | Weight (g) |
| --- | --- |
| Latex 2 | 65.00 |
| Pigment 2 | 0.85 |
| Silicone Emulsion | 0.10 |
| Surfactant | 4.50 |
| Filler | 29.92 |
| Thickener | 0.63 |
| Total | 100 |

The texture layer composition was then printed on the sample substrate structures by first preparing a rectangular specimen (such as a plastic film, foam, non-woven or the like) with approximate dimensions of 30 cm×20 cm of each sample substrate structure, and then securing the substrate structure specimen on a flat laboratory bench by applying adhesive tape on its edges. Next, a metal stencil with the desired printing pattern was place on top of the substrate structure specimen. Approximately 100 grams of the prepared texture layer composition was placed on the stencil with the help of a wooden applicator. The texture layer composition was then applied on the printing pattern of the stencil with a shearing motion while applying hand pressure downwards and with the help of a hand-held squeegee. It was observed that the texture layer composition filled the holes of the printing pattern and was transferred onto the substrate structure specimen. The stencil was removed and the printed substrate specimen was placed into a laboratory hot air circulating oven (Model VRC-35-1E, commercially available from Despatch Industries, Minneapolis, Minn., USA) for three minutes at 149° C.

After printing and curing, the adhesion of the printed texture layer to the substrate structure was tested by using the washing conditions described in the standard test method for stain release, AATCC TM-130-210, except no stains were applied. Adhesion of the printed texture layer to the corresponding substrate structure was visually evaluated for possible detachment or loss of the texture layer. The results of the evaluation are provided in Table 4. In all cases tested, the adhesion of the printed texture layer was excellent, with no loss of the printed texture layer during the test.

TABLE 4

| | Printed Substrate Sample | | | | | | | | |
| --- | --- | --- | --- | --- | --- | --- | --- | --- | --- |
| | Ex. G | Ex. H | Ex. I | Ex. L | Ex. M | Ex. N | Ex. P | Ex. Q | Comp Ex. |
| Loss of Printed Texture Layer? | No | No | No | No | No | No | No | No | No |

The scrubbing articles of the present disclosure provide a marked improvement over previous designs. By incorporating a stain release coating or agent at a face of the substrate underlying a texture layer (that otherwise provides scrubbing or scouring capabilities), user preferences for stain release are met. Further, it was surprisingly found that optional printed texture layers achieved strong adherence to stain release treated or coated substrates, including stain release coatings incorporating non-fluorochemical stain release agents. Appropriate texture layer adhesion levels were also surprisingly found with stain release coatings, including those incorporating a fluorochemical stain release agent.

Although the present disclosure has been described with reference to preferred embodiments, workers skilled in the art will recognize that changes can be made in form and detail without departing from the spirit and scope of the present disclosure.

What is claimed is:

1. A scrubbing article comprising:
   a substrate defining opposing, first and second major surfaces;
   a stain release coating, which includes a stain release agent, applied to the substrate and present over at least the first major surface; and
   a texture layer formed over the stain release coating opposite the substrate.

2. The scrubbing article of claim 1, wherein the stain release agent is a non-fluorochemical stain release agent.

3. The scrubbing article of claim 2, wherein the stain release agent includes one of polyethylene oxide and polyvinylpyrrolidone.

4. The scrubbing article of claim 2, wherein the stain release agent includes a polymer selected from the group consisting of styrene-maleic anhydride, acrylate and phenol.

5. The scrubbing article of claim 1, wherein the stain release agent is a fluorochemical stain release agent.

6. The scrubbing article of claim 5, wherein the stain release agent includes a fluorochemical urethane.

7. The scrubbing article of claim 1, wherein the stain release coating is present over the second major surface of the substrate.

8. The scrubbing article of claim 1, wherein the substrate includes a material selected from the group consisting of a nonwoven web, a woven web, a knitted web, a foam, a cellulose sponge, and a film.

9. The scrubbing article of claim 1, wherein the texture layer is printed over the stain release coating.

10. The scrubbing article of claim 1, wherein an entirety of an outer surface of the texture layer is exposed relative to the stain release coating.

11. The scrubbing article of claim 10, wherein the pattern includes a plurality of discrete segments.

12. The scrubbing article of claim 1, wherein the texture layer includes a multiplicity of ceramic microparticles.

13. The scrubbing article of claim 1, wherein the texture layer defines a pattern.

14. The scrubbing article of claim 1, wherein the texture layer comprises one of an e-beam or UV treated texture layer.

15. The scrubbing article of claim 1, further comprising:
an auxiliary substrate affixed to the second major face.

16. The scrubbing article of claim 15, wherein the auxiliary substrate includes a material selected from the group consisting of a cellulose sponge and a foam.

17. A method of producing a scrubbing article comprising:
providing a substrate defining opposing, first and second major surfaces;
applying a stain release coating to the substrate such that the stain release coating is present over at least the first major surface; and
forming a texture layer over the stain release coating opposite the substrate.

18. The method of claim 17, wherein the stain release coating includes a non-fluorochemical stain release agent.

19. The method of claim 18, wherein the stain release agent includes a material selected from the group consisting of polyethylene oxide and polyvinylpyrrolidone.

20. The method of claim 17, wherein the step of forming a texture layer includes:
providing a flowable texture layer composition; and
transferring the flowable texture layer composition onto the stain release coating.

* * * * *